United States Patent [19]

Hyun

[11] Patent Number: 4,919,529

[45] Date of Patent: Apr. 24, 1990

[54] REAR VIEW MIRROR SUNGLASSES

[76] Inventor: Kwang H. Hyun, 914 S. Ardmore Ave., Los Angeles, Calif. 90006

[21] Appl. No.: 314,774

[22] Filed: Feb. 24, 1989

[51] Int. Cl.⁵ .............................................. G02C 7/14
[52] U.S. Cl. ..................................... 351/50; 350/638
[58] Field of Search ................... 351/50, 158; 350/638

[56] References Cited

U.S. PATENT DOCUMENTS 2,545,583  3/1951  Bard ........................................ 351/50
3,617,115  11/1971  Pratt ........................................ 351/50

Primary Examiner—P. M. Dzierzynski
Attorney, Agent, or Firm—Erik M. Arnhem

[57] ABSTRACT

Eyeglasses having mirror sections enabling the wearer to view scenery behind the person's shoulder, as well as the forward scenery. The mirror sections are fully reflecting, not see-through sections, as have been employed in the known prior art. Light-blocking wall structures are located near the control axis of the eyeglasses, such that pictorial information obtained through a mirror section predominates over the forward pictorial information.

10 Claims, 2 Drawing Sheets

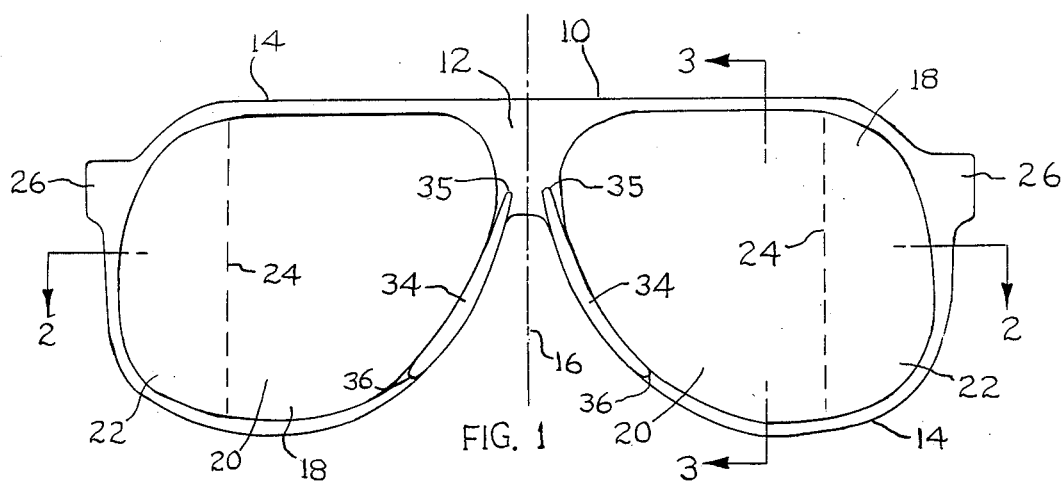
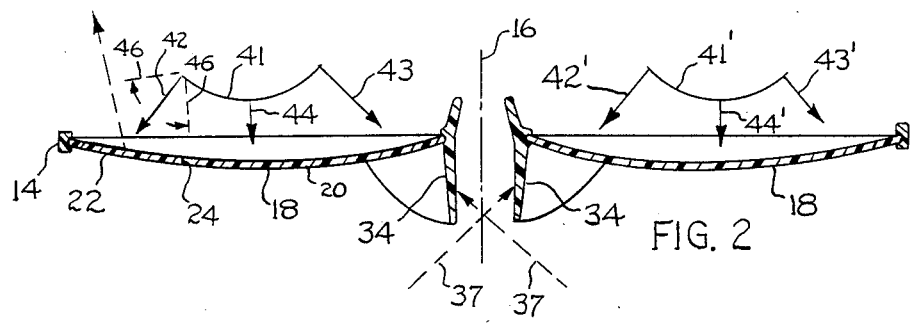
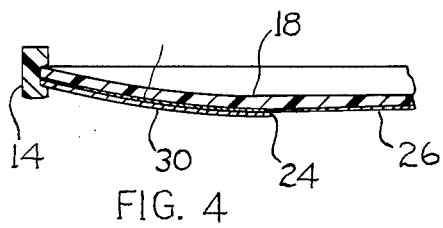
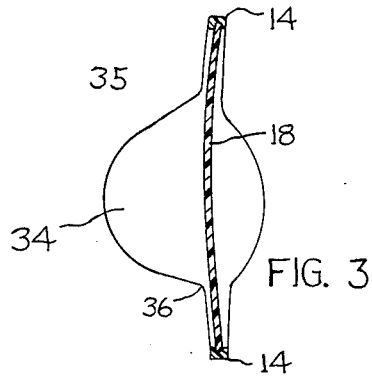

REAR VIEW MIRROR SUNGLASSES

BACKGROUND AND SUMMARY OF THE INVENTION

This invention relates to eyeglasses, particularly eyeglasses designed to permit forward vision and also rearward vision (i.e. towards areas behind the person wearing the glasses).

Currently there is on the market an eyeglass product under the tradename NUBALOO. This product comprises two lenses having see-through mirror sections extending along their outboard edges. The person wearing the eyeglasses can direct his vision toward either one of the mirror sections in order to view spatial areas behind either one of his shoulders.

One problem with the NUBALOO glasses is that the person simultaneously sees two sets of images; i.e., images behind his shoulder and other images in the area in front of the person. This double images effect is due partly to the fact that the mirror sections are "see-through" sections formed by half silver mirror coatings.

Another problem with the NUBALOO glasses is the fact that the glasses include transparent lens sections that permit forward eye vision angularly across the frame central axis (i.e. across the person's nos). When the person attempts to use one eye to view a scene in one of the mirrors the other eye simultaneously sees another forward scene along an angulated sight line passing through the eyeglass central axis. The forward scene and rearward scene tend to merge into one another especially where the two scenes meet. As a result, the two scenes blend together, without a clear demarcation between the two scenes. The forward scene viewed by the person's other eye overlaps the rearward scene viewed by the one eye, such that the person is sometimes confused as to what he is seeing.

The present invention is directed to an eyeglass construction designed to overcome the above-noted deficiencies. In one of its forms the invention comprises two laterally-spaced lenses, each lens having a transparent section near the eyeglass central axis and an opaque mirror section located outboard from the associated transparent section. A mask structure is located in the central space between the two lenses, such that eye vision angularly across the eyeglass central axis is at least partially obstructed. The person can use one eye to view the associated opaque mirror section, with minimal interference from the other eye. The forward scene viewed by the other eye is separated from the rearward scene viewed by the one eye, such that there is demarcation zone between the two scenes.

FIG. 1 is a front elevational view of a pair of eyeglasses embodying the invention.

FIG. 2 is a sectional view taken on line 2—2 in FIG. 1

FIG. 3 is a sectional view taken on line 3—3 in FIG. 1.

FIG. 4 is a fragmentary enlarged view taken in the same direction as FIG. 2.

DESCRIPTION OF A PREFERRED EMBODIMENT OF THE INVENTION

Figure 5:
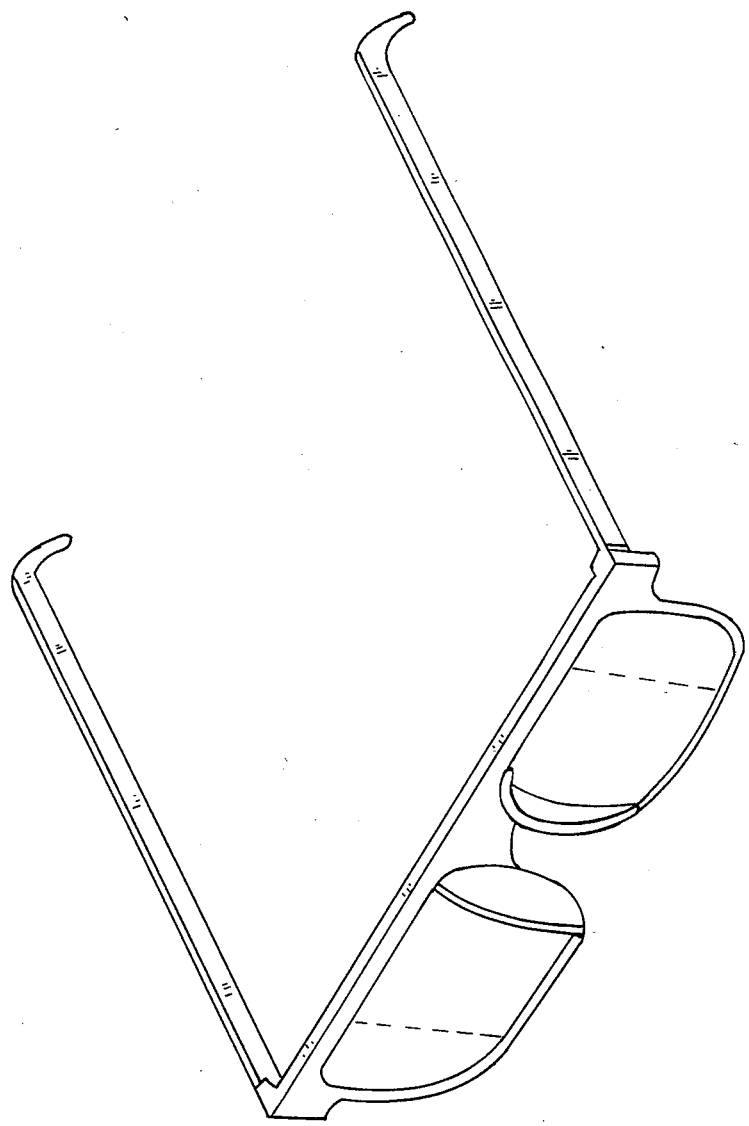
FIG. 5 is a view of the entire spectacle frame.

The embodiment of the invention shown in FIG. 1 includes an eyeglass frame 10 having a central bridge section 12 and two annular lens-support sections 14; the frame is symmetrical around an imaginary central axis 16. Each frame section 14 has an internal groove therein adapted to receive the peripheral edge of a lens 18. Each lens 18 has coatings thereon, whereby inboard section 20 of the lens is optically transparent, and outboard section 22 of the lens is optically reflective. Dashed line 24 (FIG. 1) is the separation line between the transparent and reflective lens sections.

Conventional ear pieces,(as shown in FIG. 5) are attached to lug sections 26 of frame 10 for positioning the eyeglasses on the person. FIG. 1 is a view of the eyeglasses from a point directly in front of the user. To obtain a view of the scene in front of the person, he/she will look through transparent sections 20. To obtain a view of the scene behind the person's shoulder, he/she will direct their gaze against one or the other of reflective sections 22.

The illustrated glasses are intended to be used as sunglasses. Accordingly transparent sections 20 of the lenses have a thin film (coating) of darkened material 26 thereon (FIG. 4). Film 26 acts as a sun blocker to eliminate sun glare. Lens sections 22 have a layer of mercury (or silver) 30 thereon; First layer 30 of mercury material and a second layer 26 of dark opaque material is applied over reflective layer 30, such that each lens section 22 reflects all of the light impinging thereon. FIG. 4 shows the various coatings (films) as being applied to the front faces of the lenses. However such coatings could be applied to the rear surfaces of the lenses.

As seen in FIG. 2, two walls 34 extend forwardly from frame 10 at the inboard edges of lenses 18. As seen in FIG. 1, the upper edge 35 of each wall 34 connects to bridge section 12 of the eyeglass frame. The lower edge 36 of each wall 34 connects to frame lower edge. Walls 34 may be formed as integral parts of frame 10, e.g. during the process of molding the frame. Walls 34 typically project about five eighth inch from frame 14.

Inside elevation, each wall 34 may have a half moon configuration, as shown in FIG. 3. The exact configuration and size is selected according to the size and shape of each mirror section 22. Larger mirror sections 22 will necessitate larger wall structures 34. Each wall 34 acts as an obstruction to light rays directed angularly across eyeglass central axis 16 in the directions indicated by arrows 37 (FIG. 2). Light rays in the arrow 37 direction are of principal significance when the person wearing the glasses is viewing one or the other mirror sections 22.

In FIG. 2 the person's eyeballs are indicated schematically by numerals 42 and 41'. The eyeballs move in synchronism when the person shifts his/her gaze from one direction to another. Lines 42, 43 and 44 show three different sight directions that one eye might take. Numerals 42', 43' and 44' indicate corresponding directions that the other eye might take. When one eye is sighting along line 42 the other eye will sight along line 42'. Similarly, when one eye is sighting along line 43 the other eye will sight along line 43', and so on.

When the eye sights along a given sight line it picks up pictorial information along areas on either side of the sight line, e.g. about forty five degrees in each direction. In FIG. 2 dashed lines 46 indicate generally the field of view associated with sight line 41. Thus, when the person sights along line 41 he sees the entire field encompassed by dashed lines 46. However the pictorial information on or near sight line 41 dominates the signals sent to the person's brain.

Walls 34 come into play when the person is casting his gaze onto one of the mirrored lens sections 22. For example, if the person uses one eye to sight along sight line 42, the other eye will sight along sight line 42'; the wall 34 associated with sight line 42' will block light rays that would otherwise be received along sight line 42'. In this manner the pictorial information derived by sighting along line 42 will tend to predominate over the pictorial information associated with sight line 42'. Information associated with sight line 42' will be primarily information to the right line 42' (because the associated wall 37 is blocking information to the right of line 42').

The blocking action of wall 37 enables the information associated with sight line 42 to be the predominant information transmitted to the person's brain. The blocking action tends to establish a demarcation zone between the rearward scene viewed by one eye through mirror 22 and the forward scene viewed by the other eye. The forward scene will register on the person's brain, but the scene associated with mirror 22 will predominate or standout.

The invention is concerned primarily with the "opaque" nature of mirror sections 22, and the light blocking action of walls 37. Walls 37 can be forwardly extending walls connected to frame 14 at the inboard edges of the two lenses 18. The light blocking action could also be obtained by opaque coatings on inboard areas of the lenses, i.e. at locations near central axis 16.

The drawings show a specific structure embodying the invention. However the invention can take other forms, as come within the scope of the appended claims.

I claim:

1. A pair of eyeglasses comprising:
   an eyeglass frame having a central bridge section, and two lens-support sections extending in opposite directions from said bridge section;
   a lens supported on each support section, each lens having a transparent forward-viewing section in near proximity to the central bridge section, and a rearward-viewing mirror section located outboard from the associate forward-viewing section;
   said frame having two forwardly-extending walls located at the inboard edges of the two lenses:
   whereby when the person wearing the glasses is viewing one of the mirror sections the other forwardly-extending wall blocks the person's view through the other forward-viewing.

2. The eyeglasses recited in claim 1 wherein each mirror section completely obstructs forward vision therethrough.

3. The eyeglasses recited in claim 1 wherein each forwardly-extending wall has a half moon configuration in the side elevation direction.

4. The eyeglasses claimed in claim 1 wherein each half moon wall projects forwardly from the general plane of the eyeglass frame approximately five eighth inch.

5. The eyeglasses of claim 1 wherein the forwardly-extending walls extend generally normal to the general plane of the eyeglass frame.

6. The eyeglasses of claim 1 wherein each lens has a concave rear face and a convex front face.

7. The eyeglasses of claim 1 and further comprising a sun block film on the transparent forward-viewing section of each lens, whereby the eyeglasses are usable as sun glasses.

8. A pair of eyeglasses comprising: an eyeglass frame having a central axis;
   two laterally-spaced lenses carried on said frame;
   each lens having a transparent forward-viewing section, and a rearward-viewing section;
   and wall means extending forwardly from the eyeglass frame to obstruct eye vision angularly across the frame central axis;
   whereby when the person wearing the glasses is viewing one of the rearward-viewing sections said wall means blocks the person's view through the other forward-viewing section.

9. The eyeglasses of claim 1 wherein each rearward-viewing section completely obstructs forward vision therethrough.

10. A pair of eyeglasses comprising:
    an eyeglass frame that includes a central bridge section, and two annular lens-support sections extending in opposite directions from said bridge section;
    a lens mounted within each annular section; each lens including a transparent section for forward viewing and a mirror section for rearward viewing.
    and mask means near the central axis of the eyeglass frame for obstructing eye vision angularly across the frame central axis.

* * * * *